Dec. 8, 1964 A. J. MARKO 3,160,756
ELECTRO-OPTICAL PULSE COUNTER
Filed Feb. 20, 1961
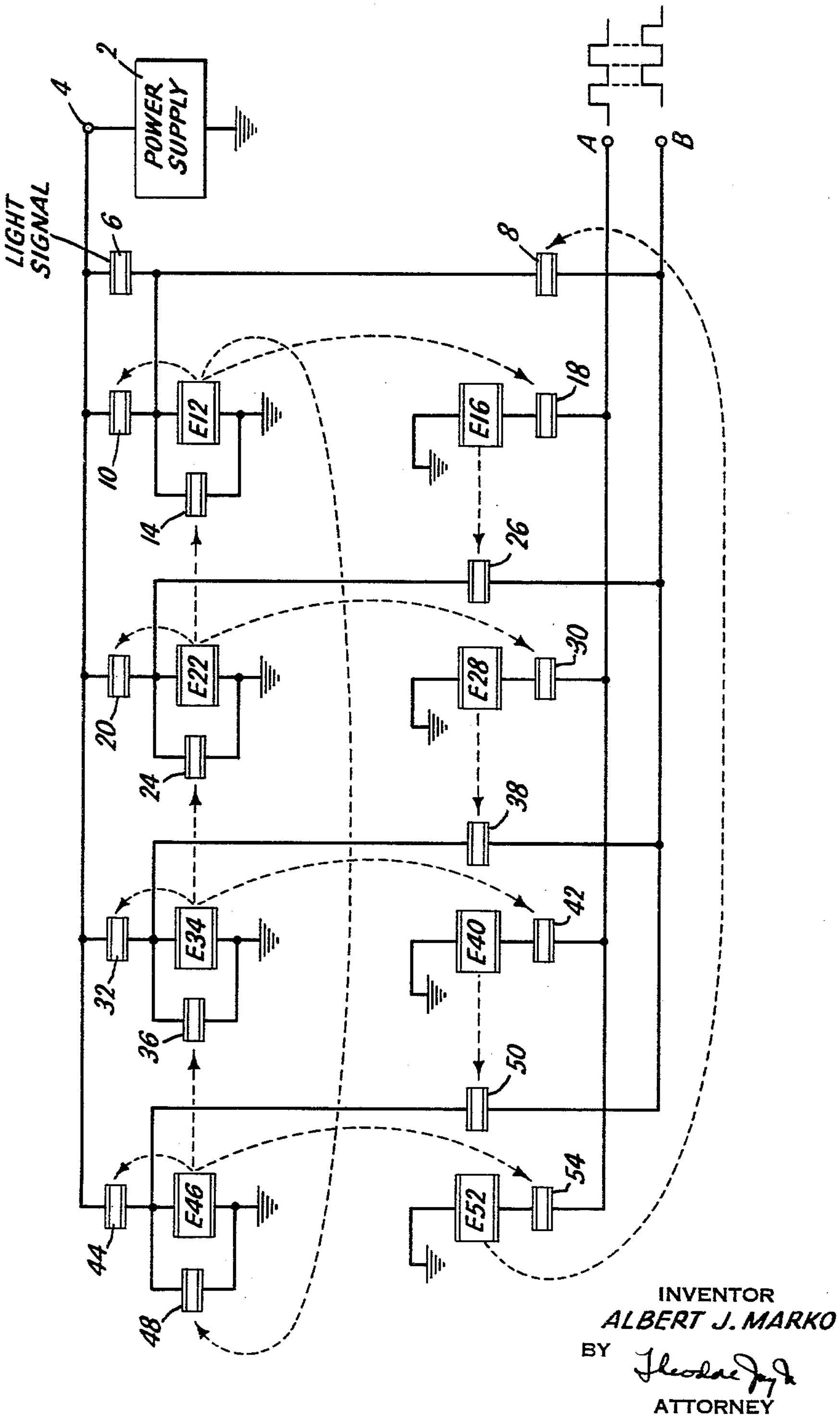
INVENTOR
ALBERT J. MARKO
BY [signature]
ATTORNEY United States Patent Office 3,160,756
Patented Dec. 8, 1964

3,160,756
ELECTRO-OPTICAL PULSE COUNTER
Albert J. Marko, Deer Park, N.Y., assignor to General Telephone and Electronics Laboratories, Inc., a corporation of Delaware
Filed Feb. 20, 1961, Ser. No. 90,319
8 Claims. (Cl. 250—209)

*Counter*

My invention is directed toward electronic counters for counting the number of pulses present in an incident pulse train, and more particularly relates to counters which count the number of pulses present in one pulse train during successive time periods established by the time separation between adjacent pulses in another pulse train.

This latter type of counter is employed, for example, in computers, wherein the pulses in one train are to be counted for purposes of information processing and the pulses in the second train are clock pulses which establish the timing of the counting operation.

I have invented a new type of electronic counter responsive to first and second pulse trains which utilizes only electroluminescent cells and photoconductive cells in contradistinction to the electrically active components such as transistors or vacuum tubes hitherto employed. Moreover, my counter does not use any resistors, capacitors or inductors conventionally required. As a consequence, my counter can be easily constructed at low cost and requires minimal maintenance.

In accordance with the principles of my invention, my counter includes first and second sets. Each set contains an identical number of different units arranged in a linear array in which each unit is positioned behind one adjacent unit and ahead of another adjacent unit.

Each unit consists of an electroluminescent cell and a photoconductive element electrically connected in series. The first set units are all connected in parallel between first and second terminals. The second set units are all connected in parallel between the second terminal and a third terminal. The cell and element of each first set unit are optically coupled together while the cell and element of each second set unit are optically isolated from each other. Each second set element is optically coupled to a corresponding first set cell.

My counter further includes first and second groups, each group containing said identical number of different photoconductive elements. Each first set cell shunts a corresponding first group element and is connected through a corresponding second group elements to a fourth terminal. Each first group element is optically coupled to the first set cell immediately ahead of the first set cell to which this element corresponds. Each second group element is optically coupled to the second set cell immediately behind the second set cell corresponding to the first set cell to which this element is connected.

The counter can be used in the following manner. A power supply is connected between the first and second terminals of the counter, and an additional photoconductive element is coupled between the first terminal and the first electroluminescent cell in the first set. The counter is turned on by momentarily illuminating the additional element. This action energizes the first electroluminescent cell in the first set while all other first set cells are dark. This indicates a pulse count of zero.

A first pulse train containing pulses to be counted is applied between the second and third terminals. A second pulse train containing pulses which establish the duration of the periods in which the counting operation takes place is applied between the second and fourth terminals. The first pulse in the second train precedes the first pulse in the first train. The pulses in these two trains are in antiphase; i.e. the pulses in the one train are in time coincidence with the spaces between pulses in the other train.

The first pulse in the second train then momentarily energizes the first electroluminescent cell in the second set while the first electroluminescent cell in the first set remains lit and all other electroluminescent cells in both sets remain dark.

The first pulse in the first train then energizes the second electroluminescent cell in the first set, and at the same time this action also extinguishes the first electroluminescent cell in the first set. Consequently, the second electroluminescent cell in the first set is the only cell in this set that is lit, and indicates that one pulse has been received.

The second pulse in the second train then momentarily energizes the second electroluminescent cell in the second set while all other second set cells remain dark. The second pulse in the first train then energizes the third electroluminescent cell in the first set and extinguishes the second cell in the first set, this indicating a count of two.

The above procedure is repeated until the count reaches a number equal to one unit less the total number of units in the first set. The next pulse in the first train then resets the counter to its original condition (i.e. a pulse count of zero) and the entire counting process can be repeated.

For certain applications it is necessary to eliminate the automatic reset procedure discussed above. This elimination can be accomplished by eliminating one photoconductive element in each of the first and second groups in such a manner that the first electroluminescent cell in the first set is connected directly to the first terminal and the last electroluminescent cell in the first set is no longer shunted by a first group element. Under these conditions, the counter must be reset automatically as, for example, momentarily disconnecting the counter from the power supply, then reconnecting the counter and momentarily illuminating the additional element.

An illustrative embodiment of my invention is shown in the accompanying Figure.

Referring to the figure, I provide a first set of units, each unit consisting of electroluminescent cells and photoconductive elements in series connection. More specifically, a this first set consists of cells E12, E22, E34 and E46 in respective series connection with photoconductive elements 10, 20, 32 and 44. These first set units are connected in parallel between terminal 4 and ground.

Similarly, I provide a second set of units, each unit also consisting of series connected electroluminescent cells and photoconductive elements. In particular, the second set of units consists of electroluminescent cells E16, E28, E40 and E52 in respective series connection with photoconductive elements 18, 30, 42 and 54. These second set units are connected in parallel between terminal A and ground.

I further provide first and second groups, each of which contain four different photoconductive elements. The first group consists of elements 14, 24, 36 and 48. The second group consists of elements 8, 26, 38 and 50. Each of the first group elements 14, 24, 36 and 48 shunts a corresponding one of the electroluminescent cells E12, E22, E34 and E46 in the first set. Each of the first set cells E12, E22, E34 and E46 is coupled through a corresponding one of the second group elements 8, 26, 38 and 50 to terminal B.

The dotted lines in the Figure indicate the optical coupling between various cells and photoconductive elements.

As shown in the drawing, each of the first set cells E12, E22, E34 and E46 is optically coupled to both a corresponding one of the first set elements 10, 20, 32 and 44 as well as to the corresponding one of the second set elements 18, 30, 42 and 54. Further, each first group element is optically coupled to the first set electroluminescent cell immediately preceding the cell that this element shunts. Hence, each of the first group elements 14, 24, 36 and 48 is optically coupled to a corresponding one of the first set cells E22, E34, E46 and E12. Finally, each of the second set electroluminescent cells E16, E28, E40 and E52 is optically coupled to a corresponding one of the second group elements 26, 38, 50 and 8. A power supply, for example, an alternating voltage source 2 is coupled between terminal 4 and ground. A first pulse train is supplied between terminal B and ground. A second pulse train is supplied between terminal A and ground. As can be seen from the waveforms shown, the pulses in the two trains are in antiphase, i.e. the pulses in one train coincide in time with the spaces between pulses in the other train, and the leading and trailing edges of any first train pulse coincide with the trailing edge of one second train pulse the leading edge of the next successive second train pulse. The operation of the device can be explained as follows.

In the absence of incident light each of the photoconductive elements represents a very high impedance. When any of these elements is irradiated with light, it is triggered into a very low impedance state. Initially all elements are dark and the counter is not operative. To start the counting process, a burst or pulse of light is directed upon photoconductive element 6 which is then momentarily triggered into a low impedance state. This action connects cell E12 through the low impedance element 6 to the power supply, and cell E12 is lit and indicates a pulse count of zero. When cell E12 is lit, the element 10 is triggered into its low impedance state and clamps cell E12 across the power supply. The photoconductive element 6 then returns to its high impedance state, but due to the clamping action, cell E12 remains lit. When cell E12 is lit, element 18 is illuminated and is in its low impedance state. All other second group elements are dark and represent high impedance. At this point, the first pulse in the second train is produced. This pulse passes through element 18 and energizes cell E16.

Cell E16 illuminates element 26. The first pulse in the first train then passes through element 26 and energizes cell E22 which is then lit and indicates a pulse count of one. When cell E22 is lit, element 14 is lit and effectively short-circuits and extinguishes cell E12.

This process continues until cell E46 is lit and indicates a count of three. At this point, the next second train pulse will energize cell E52 and trigger element 8 into the low impedance state. Thereafter, the next first train pulse will energize cell E12 and resets the counter to its original condition, thus indicating a count of zero.

If the automatic reset procedure is not to be used, elements 8 and 48 should be taken out of the circuit. Under these conditions, after cell E46 is lit, additional first train or second train pulses will have no influence and the counter can only be reset by momentarily disconnecting the couter from supply 2, then reconnecting the counter to the supply and momentarily irradiating photoconductive element 6 with a burst of light.

What is claimed is:

1. An electroluminescent device comprising first and second sets of photoconductor-electroluminescent units, each set containing a like plurality of said units arranged in a linear array, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; and first and second groups of photoconductive elements, the number of elements in each group being equal to $(N-1)$, each first set cell other than the last cell in the first set shunting a corresponding first group element, each first set cell other than the first cell in the first set being connected through a corresponding second group element to a fourth terminal, each first group element being optically coupled to the first set cell immediately preceding the first set cell shunted by it, each second set cell other than the last cell in the second set being optically coupled to the second group element which is connected to the first set cell immediately preceding the first set cell corresponding to said each second set cell.

2. An electroluminescent device comprising first and second sets of photoconductor-electroluminescent units, each set containing a like plurality of said units arranged in a linear array, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; and first and second groups of photoconductive elements, the number of elements in each group being equal to $(N-1)$, each first set cell other than the last cell in the first set shunting a corresponding first group element, each first set cell other than the first cell in the first set being connected through a corresponding second group element to a fourth terminal, each first group element being optically coupled to the first set cell immediately preceding the first set cell shunted by it, each second set cell other than the last cell in the second set being optically coupled to the second group element which is connected to the first set cell immediately preceding the first set cell corresponding to said each second set cell; and an additional photoconductive element coupled between said first terminal and the electroluminescent cell in the first unit of the first set.

3. An electroluminescent device comprising first and second sets of photoconductor-electroluminescent units, each set containing a like plurality of said units arranged in a linear array, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; and first and second groups of photoconductive elements, the number of elements in each group being equal to $(N-1)$, each first set cell other than the last cell in the first set shunting a corresponding first group element, each first set cell other than the first cell in the first set being connected through a corresponding second group element to a fourth terminal, each first group element being optically coupled to the first set cell immediately preceding the first set cell shunted by it, each second set cell other than the last cell in the second set being optically coupled to the second group element which is connected to the first set cell immediately preceding the first set cell corresponding to said each second set cell; an additional photoconductive element coupled between said first terminal and the electroluminescent cell in the first unit of the first set; and a power supply coupled between said first and second terminals.

4. An electroluminescent device responsive to first and second pulse trains, the pulses in one train being in time coincidence with the spaces between pulses in the other train, said device comprising first and second sets of photoconductive-electroluminescent units, each set containing a like plurality of said units, said plurality being equal to N where N is any integer greater than 1, the units in each set being arranged in a linear array, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; first and second groups of photoconductive elements, the number of elements in each group being equal to $(N-1)$, each first set cell other than the last cell in the first set shunting a corresponding first group element, each first set cell other than the first cell in the first set being connected through a corresponding second group element to a fourth terminal, each first group element being optically coupled to the first set cell immediately preceding the first set cell shunted by it, each second set cell other than the last cell in the second set being optically coupled to the second group element which is connected to the first set cell immediately preceding the first set cell corresponding to said each second set cell; means to apply said first train between third and second terminals; means to apply said second train between said fourth and second terminals; an additional photoconductive element coupled between the first terminal and the electroluminescent cell in the first unit of the first cell; and a power supply coupled between the first and second terminals.

5. An electroluminescent device comprising first and second sets of photoconductive and electroluminescent units, each set containing a like plurality of said units arranged in a linear array in which each unit is positioned behind one adjacent unit and ahead of another adjacent unit, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; and first and second groups of photoconductive elements, the number of elements in each group being equal to N, each first set cell shunting a corresponding first group element and being connected through a corresponding second group element to a fourth terminal, each first group element being optically coupled to the first set cell immediately preceding the first set cell shunted by it, each second group element being optically coupled to the second set cell immediately behind the second set cell corresponding to the first set cell to which it is connected.

6. An electroluminescent device comprising first and second sets of photoconductive-electroluminescent units, each set containing a like plurality of said units arranged in a linear array in which each unit is positioned behind one adjacent unit and ahead of another adjacent unit, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; first and second groups of photoconductive elements, the number of elements in each group being equal to N, each first set cell shunting a corresponding first group element and being connected through a corresponding second group element to a fourth terminal, each first group element being optically coupled to the first set cell immediately preceding the first set cell shunted by it, each second group element being optically coupled to the second set cell immediately behind the second set cell corresponding to the first set cell to which it is connected; and an additional photoconductive element coupled between said first terminal and one of the electroluminescent cells in the first set.

7. An electroluminescent device comprising first and second sets of photoconductive-electroluminescent units, each set containing a like plurality of said units arranged in a linear array in which each unit is positioned behind one adjacent unit and ahead of another adjacent unit, said plurality being equal to N where N is any integer greater than 1, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; first and second groups of photoconductive elements, the number of elements in each group being equal to N, each first set cell shunting a corresponding first group element and being connected through a corresponding second group element to a fourth terminal, each first group element being optically coupled to the first set cell immediately preceding the first set cell shunted by it, each second group element being optically coupled to the second set cell immediately behind the second set cell corresponding to the first set cell to which it is connected; an additional photoconductive element coupled between said first terminal and one of the electroluminescent cells in the first set; and a power supply coupled between the first and second terminals.

8. An electroluminescent device responsive to first and second pulse trains, the pulses in one train being in time coincidence with the spaces between pulses in the other train, said device comprising first and second sets of photoconductive-electroluminescent units, each set containing a like plurality of said units, said plurality being equal to N where N is any integer greater than 1, the units in each set being arranged in a linear array in which each unit is positioned behind one adjacent unit and ahead of another adjacent unit, each unit consisting of an electroluminescent cell and a photoconductive element electrically connected in series, all first set units being connected in parallel between first and second terminals, all second set units being connected in parallel between a third terminal and said second terminal, the cell and element of each first set unit being optically coupled together, the cell and element of each second set being optically isolated from each other, each second set element being optically coupled to a corresponding first set cell; first and second groups of photoconductive elements, the number of elements in each group being equal to N, each first set cell shunting a corresponding first group element and being connected through a corresponding second group element to a fourth terminal, each first group element being optically coupled to the first set cell immediately preceding the first set cell shunted by it, each second group element being optically coupled to the second set cell immediately behind the second set cell corresponding to the first set cell to which it is connected; means to apply said first and second trains between said third and second terminals and said fourth and second terminals respectively; an additional photoconductive element coupled between the first terminal and one electroluminescent cell in the first set; and a power supply coupled between said first and second terminals.

References Cited in the file of this patent

UNITED STATES PATENTS

| | | |
|---|---|---|
| 2,727,683 | Allen et al. | Dec. 20, 1955 |
| 2,895,054 | Loebner | July 14, 1959 |
| 2,900,522 | Reis | Aug. 18, 1959 |
| 2,907,001 | Loebner | Sept. 29, 1959 |
| 2,949,538 | Tomilson | Aug. 16, 1960 |
| 2,985,763 | Ress | May 23, 1961 |
| 2,996,622 | Acton | Aug. 15, 1961 |
| 2,999,165 | Lieb | Sept. 5, 1961 |
| 3,011,157 | Anderson | Nov. 28, 1961 |